United States Patent
Kotsatos (10) Patent No.: US 9,532,518 B2
(45) Date of Patent: Jan. 3, 2017

(54) HYDROPONIC GROWING SYSTEM

(71) Applicant: Vasilios M. Kotsatos, Rockville, MD (US)

(72) Inventor: Vasilios M. Kotsatos, Rockville, MD (US)

( * ) Notice: Subject to any disclaimer, the term of this patent is extended or adjusted under 35 U.S.C. 154(b) by 281 days.

(21) Appl. No.: 14/032,258

(22) Filed: Sep. 20, 2013

(65) Prior Publication Data

US 2014/0083008 A1   Mar. 27, 2014

Related U.S. Application Data

(60) Provisional application No. 61/703,995, filed on Sep. 21, 2012.

(51) Int. Cl.
*A01G 31/06* (2006.01)
*A01G 31/02* (2006.01)

(52) U.S. Cl.
CPC ............... *A01G 31/06* (2013.01); *A01G 31/02* (2013.01); *Y02P 60/216* (2015.11)

(58) Field of Classification Search
CPC ......... A01G 31/06; A01G 31/02; A01G 31/00
USPC ................ 47/62 R, 62 N, 62 C, 62 E, 83, 82
See application file for complete search history.

(56) References Cited

U.S. PATENT DOCUMENTS

| | | | | |
|---|---|---|---|---|
| 4,211,034 A * | 7/1980 | Piesner | ......................... | 47/62 E |
| 4,255,896 A * | 3/1981 | Carl | ............... | 47/62 C |
| 4,630,394 A * | 12/1986 | Sherard | ......................... | 47/59 R |
| 4,669,217 A * | 6/1987 | Fraze | ............................... | 47/64 |
| 4,860,490 A * | 8/1989 | Morris | ................... | A01G 31/02 |
| | | | | 47/59 R |
| 5,557,884 A * | 9/1996 | Deppe | .......................... | 47/62 E |
| 6,247,268 B1 * | 6/2001 | Auer | ............................. | 47/62 R |
| 7,176,024 B2 * | 2/2007 | Branson et al. | ............. | 435/420 |
| 2007/0011944 A1 * | 1/2007 | Triantos | ....................... | 47/62 R |
| 2009/0126269 A1 * | 5/2009 | Wilson et al. | ................ | 47/62 R |
| 2011/0067301 A1 * | 3/2011 | DeMitchell et al. | ......... | 47/62 C |

FOREIGN PATENT DOCUMENTS

| | | | | | |
|---|---|---|---|---|---|
| JP | 01291730 | A * | 11/1989 | ............. | A01G 31/00 |
| JP | 02171124 | A * | 7/1990 | ............. | A01G 31/00 |
| JP | 06007048 | A * | 1/1994 | ............. | A01G 31/00 |

(Continued)

OTHER PUBLICATIONS

JP 2002-223648 machine translation.*
JP 2007-259816 machine translation.*

*Primary Examiner* — Son T Nguyen
(74) *Attorney, Agent, or Firm* — Blank Rome LLP (57) ABSTRACT

A hydroponic growing system that comprises a plurality of parallel horizontal pipes, a vertical drain pipe, and a plurality of nutrient-delivering tubes. The horizontal pipes are adapted to support crops that receive nutrients from the nutrient-delivering tubes and grow in high density. The horizontal pipes have opposite first and second ends, as well as a plurality of openings along a length, and a plurality of pipe segments extending angularly from an outer surface. The vertical drain pipe has a plurality of angular pipe extensions along a length, which mate with one of the first and second ends of the horizontal pipes. The nutrient-delivering tubes have openings along a length and extend from the vertical drain pipe, branching through the pipe segments extending from the horizontal pipes.

20 Claims, 8 Drawing Sheets

(56) References Cited

FOREIGN PATENT DOCUMENTS

| JP | 2002186370 A | * | 7/2002 | ............ A01G 27/04 |
|---|---|---|---|---|
| JP | 2002223648 A | * | 8/2002 | ............ A01G 31/00 |
| JP | 2007259816 A | * | 10/2007 | |
| JP | 2010154822 A | * | 7/2010 | |
| WO | WO 2004008840 A1 | * | 1/2004 | ............ A01G 31/00 |
| WO | WO 2010029993 A1 | * | 3/2010 | ............ A01G 31/06 |
| WO | WO 2010073901 A1 | * | 7/2010 | ............ A01G 31/06 |

* cited by examiner

HYDROPONIC GROWING SYSTEM

CROSS-REFERENCE TO RELATED APPLICATIONS

This application claims priority to U.S. Provisional App. No. 61/703,995, filed Sep. 21, 2012, the disclosure of which is incorporated herein by reference in its entirety.

FIELD OF THE INVENTION

The present application relates to a hydroponic system for growing crops, produce and other plants. The hydroponic system allows for the growth of a large volume of crops and can fit in a compact area. Further, the system provides for recycling of the nutrient-rich water used to feed the plant life.

BACKGROUND OF THE INVENTION

The field of hydroponics involves a method of growing plants without soil. The roots of the plants may be in solution supported with or without gravel, mineral wool, clay, and the like. Hydroponics has become very popular over the last century around the world because no soil is needed to grow plants, the system is highly controlled, which reduces nutrition pollution and pesticide damage, and crop yields are high.

A hydroponic system is needed that can allow for the growth of a large volume of plants and crops in a small space. Additionally, systems which optimize the recycling of nutrients are desirable.

SUMMARY OF THE INVENTION

Accordingly, the present invention relates to a hydroponic growing system comprising a plurality of parallel horizontal pipes, a vertical drain pipe and a plurality of nutrient-delivering tubes. The plurality of parallel horizontal pipes have opposite first and second ends, a plurality of openings along a length between the first and second ends on one side thereof through which crops grow, and a plurality of pipe segments extending angularly from an outer surface on an opposing side thereof. The vertical drain pipe has a plurality of angular pipe extensions along a length thereof. The pipe extensions mate with one of the first and second ends of the plurality of parallel horizontal pipes. The nutrient-delivering tubes have openings along a length thereof and extend from the vertical drain pipe and branch through the plurality of pipe segments. Each horizontal pipe is adapted to support crops that receive nutrients from the nutrient-delivering tubes, thereby producing crops in high density.

The present invention also relates to a method of growing crops using a hydroponic growing system, comprising the steps of providing a plurality of parallel horizontal pipes, a vertical drain pipe and a plurality of nutrient-delivering tubes. The plurality of parallel horizontal pipes have opposite first and second ends, a plurality of openings along a length between the first and second ends on one side thereof through which crops grow, and a plurality of pipe segments extending angularly from an outer surface on an opposing side thereof. The vertical drain pipe has a plurality of angular pipe extensions along a length thereof. The pipe extensions mate with one of the first and second ends of the plurality of parallel horizontal pipes. The nutrient-delivering tubes have openings along a length thereof and extend from the vertical drain pipe and branch through the plurality of pipe segments. Each horizontal pipe is adapted to support crops that receive nutrients from the nutrient-delivering tubes, thereby producing crops in high density. Crops are then placed in the horizontal pipes adjacent to said openings, the vertical drain pipe is filled with nutrient-enriched water, and the water is then pumped from the vertical drainpipe through the nutrient-delivering tubes. The water exits the openings in the nutrient-delivering tubes, feeds the crops, and then drains back to the vertical drain pipe through the angular pipe extensions and pipe segments for recycling.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

Hydroponic systems where the roots of the plants are sustained only in solution are known as solution cultures. Within the category of solution cultures, there are three different types of systems: static solution cultures, continuous-flow solution cultures, and aeroponics. In a continuous-flow solution culture, the nutrient-rich solution constantly flows past the roots, which requires some automation, but allows for adjustments to the temperature and composition of the solution.

Referring to FIGS. 1-6, the hydroponic growing system 100 of the present invention is a continuous-flow solution culture that generally comprises a plurality of parallel horizontal pipes 102, a vertical drain pipe 108 and a plurality of nutrient-delivering tubes 112. The horizontal pipes 102 are adapted such that they house the crops or plants which are to be grown in the system. The crops or plants are grown from seed in a support structure, e.g., a starter tray, and when they reach approximately four inches in height, they are transferred to the horizontal pipes 102. The vertical drain pipe 108 allows for the recycling of nutrient-enriched water, which is supplied to the crops via the nutrient-delivering tubes 112. The entire system is preferably designed to fit into a small footprint, such as a 12 foot×12 foot area, and provides for the high-density growth of crops, e.g., up to 850 small crops, such as bell peppers, tomatoes, cucumbers, zucchini, squash and the like.

Figure 1A:
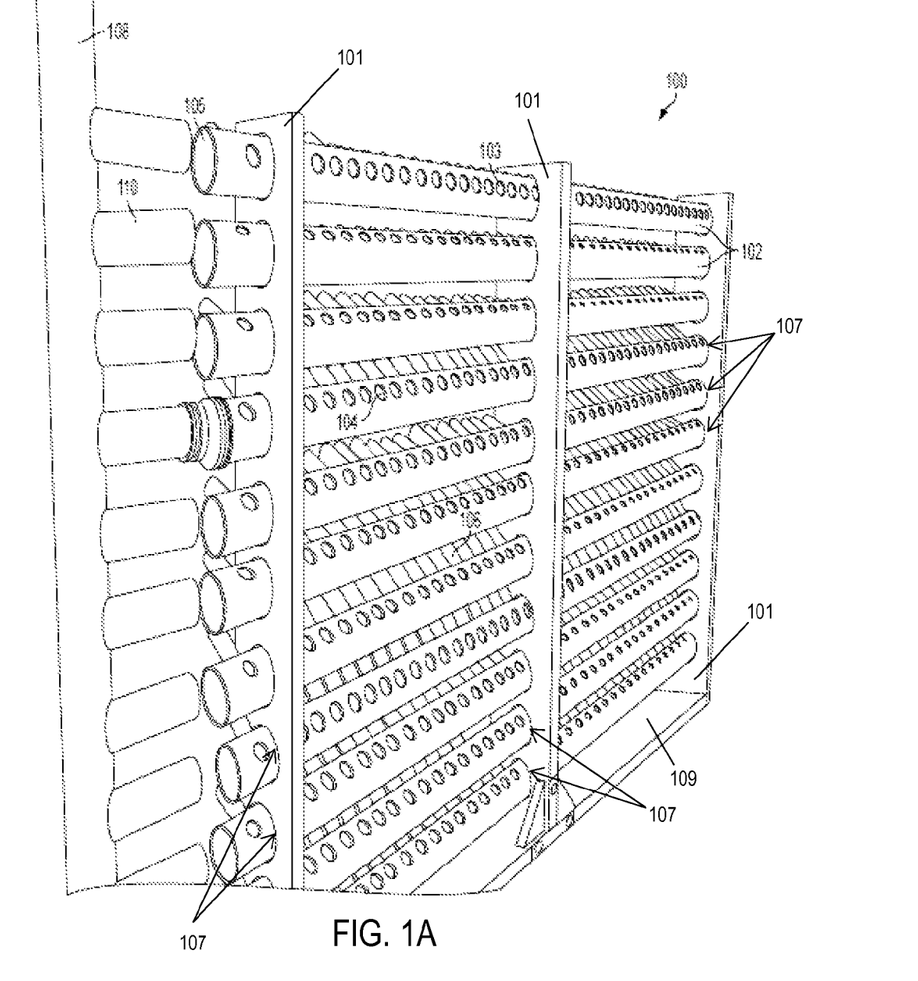
FIG. 1A is a front perspective view of a hydroponic growing system in accordance with an exemplary embodiment of the invention.
Figure 1B:
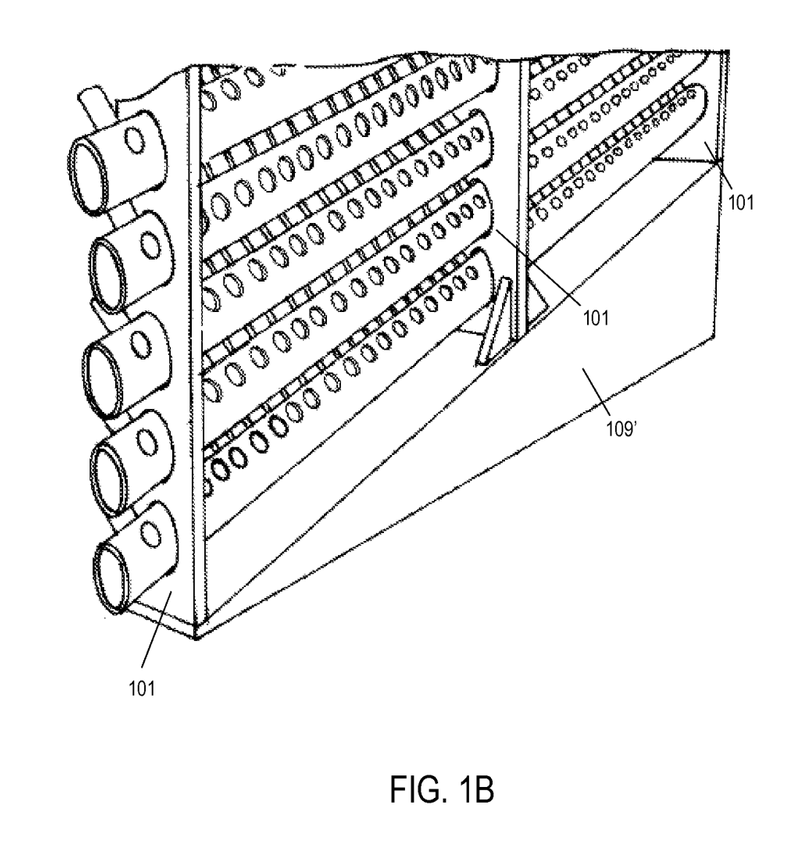
FIG. 1B is a front plan view of the hydroponic growing system of FIG. 1A constructed on a slant in accordance with an exemplary embodiment of the invention.
Figure 2:
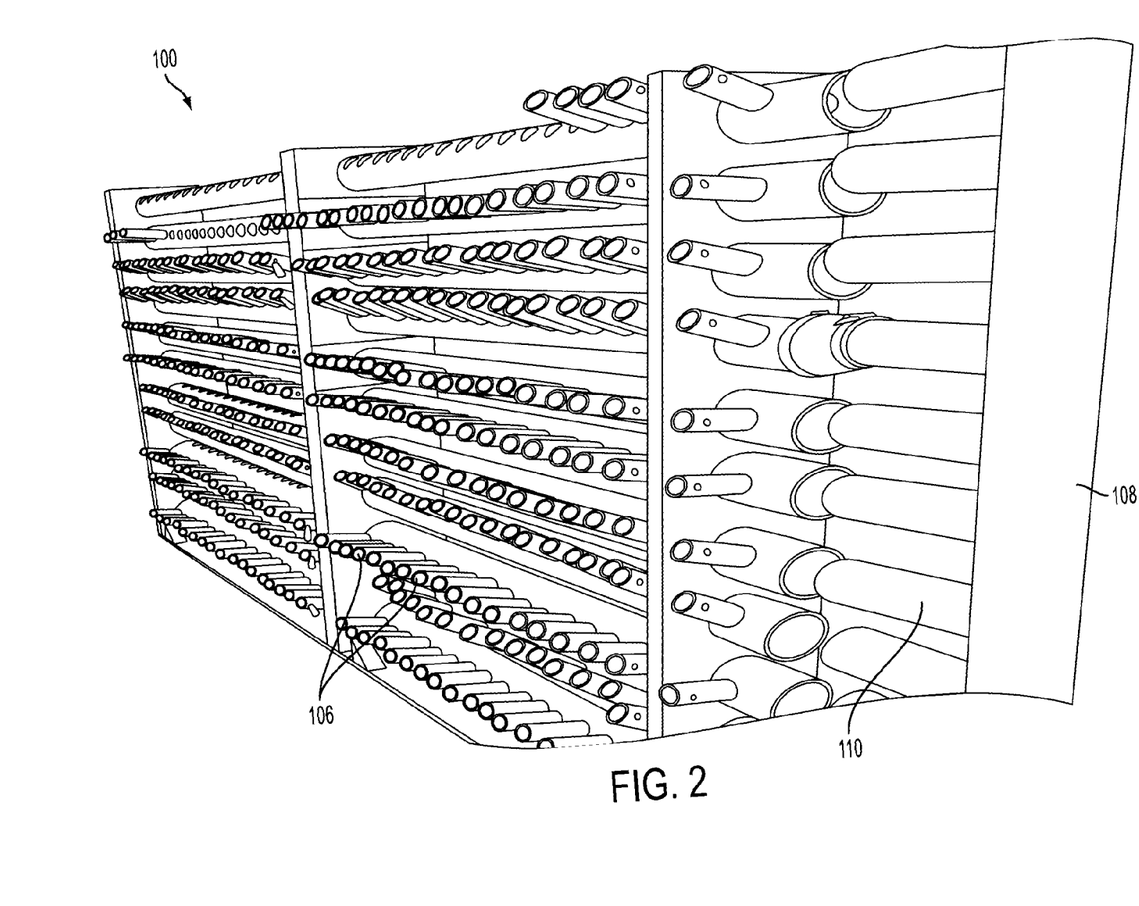
FIG. 2 is a rear perspective view of the hydroponic growing system illustrated in FIG. 1A.
Figure 5:
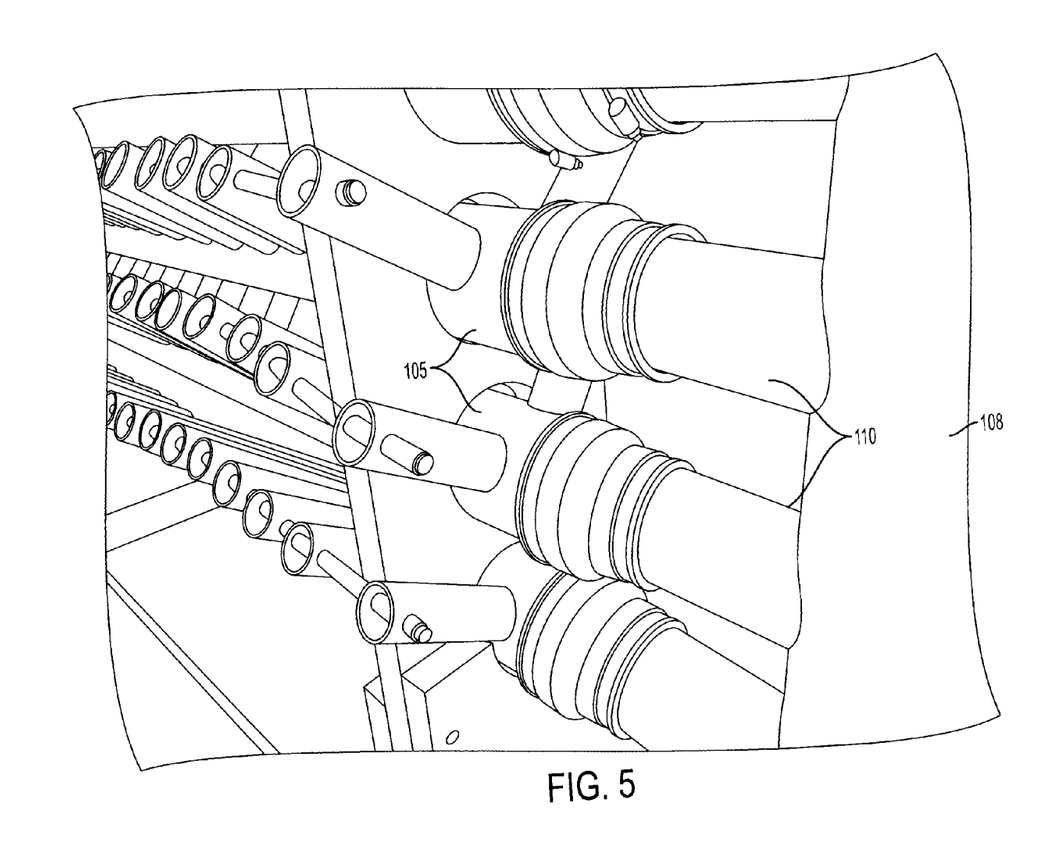
FIG. 5 is a perspective view of the vertical drain in accordance with an exemplary embodiment of the present invention.

As seen in FIGS. 1-2 and 5, the horizontal pipes 102 have opposite first and second ends 103 and 105, respectively, and a plurality of openings 104 along a length between the first and second ends 103 and 105 on one side. The horizontal pipes 102 may be substantially cylindrical. The crops grow inside of the horizontal pipes 102 and extend outward through the openings 104. A plurality of pipe segments 106 extend angularly, preferably substantially perpendicularly, from an outer surface on an opposing side of the horizontal pipes 102. As seen in FIG. 5, the vertical drain pipe 108 is situated adjacent to the second ends 105 of the horizontal pipes 102 and has a plurality of angular pipe extensions 110 along a length thereof. The angular pipe extensions 110 mate with the second ends 105 of the horizontal pipes 102.

Figure 3:
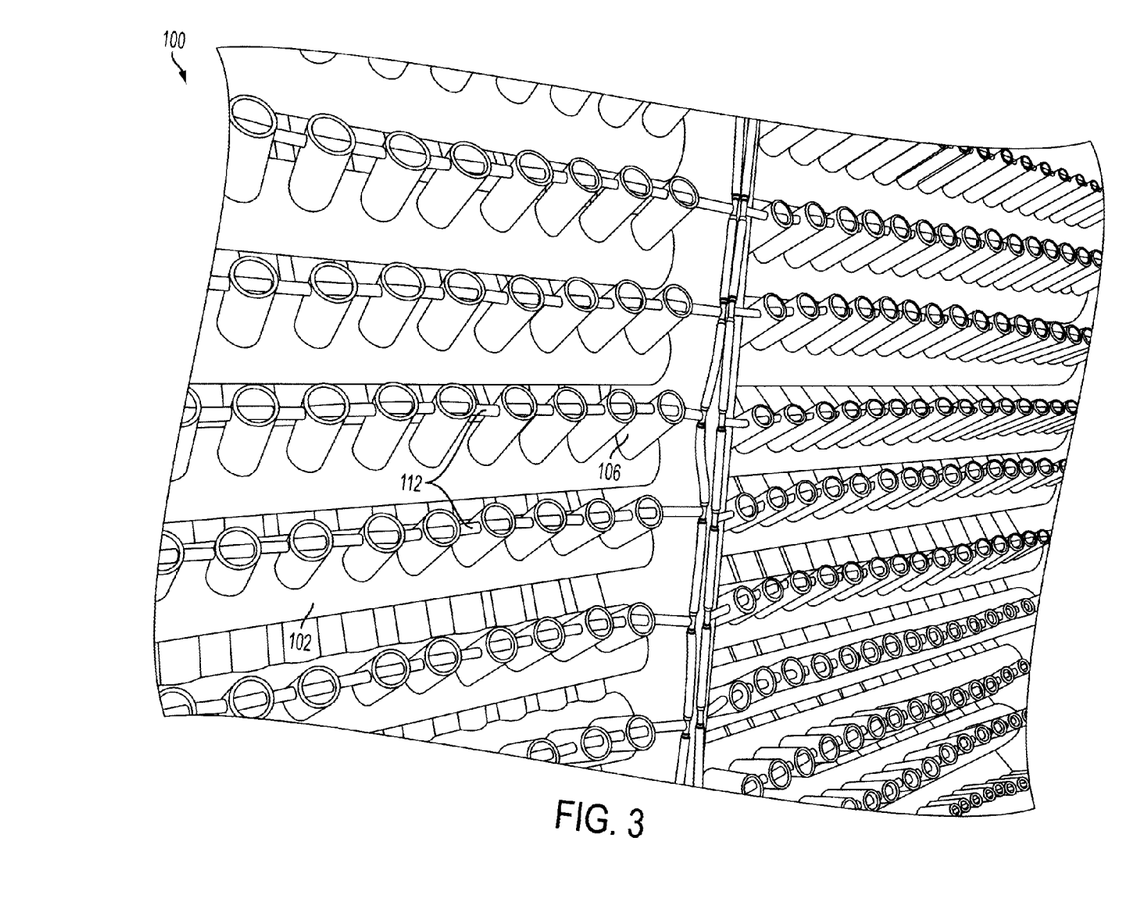
FIG. 3A is a rear perspective view of the hydroponic growing system illustrated in FIG. 1A.
FIG. 3B is a cross-sectional view of the interior of the pipe segment of the hydroponic growing system illustrated in FIG. 1A.
Figure 3B:
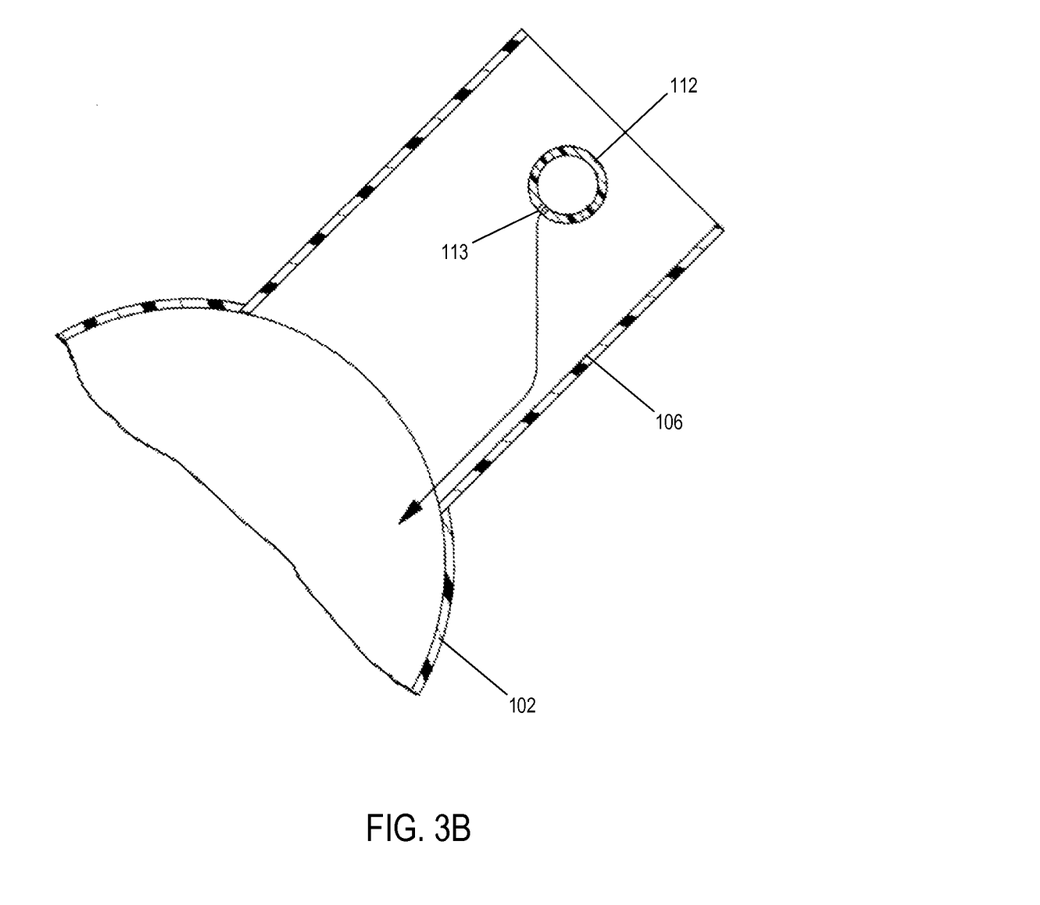
Figure 4:
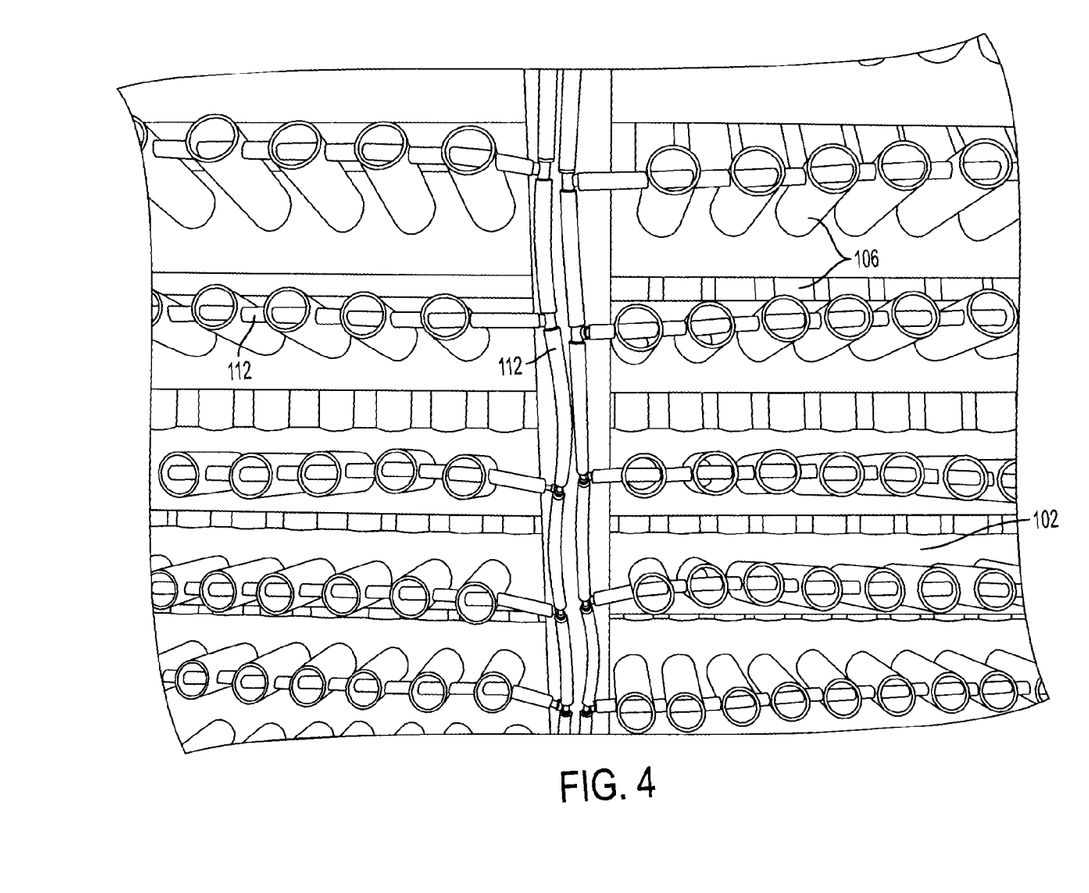
FIG. 4 is a plan view of the hydroponic piping system in accordance with an exemplary embodiment of the present invention.

As seen in FIGS. 3 and 4, a plurality of nutrient-delivering tubes 112 having openings 113 along a length thereof branch through a portion of the plurality of pipe segments 106 extending from the horizontal pipes 102. The nutrient-delivering tubes 112 preferably extend from the base of the vertical drain pipe 108, where they receive recycled nutrient-enriched water. As depicted in FIG. 4, the nutrient-delivering tubes 112 are fed through opposing circular openings on the pipe segments 106, which hold the nutrient-delivering tubes 112 in place. In use, the nutrient-rich water travels through the plurality of nutrient-delivering tubes 112, exits through the openings 113 into pipe segments 106 and travels down into the horizontal pipes 102 where the crops are stored.

Figure 6:
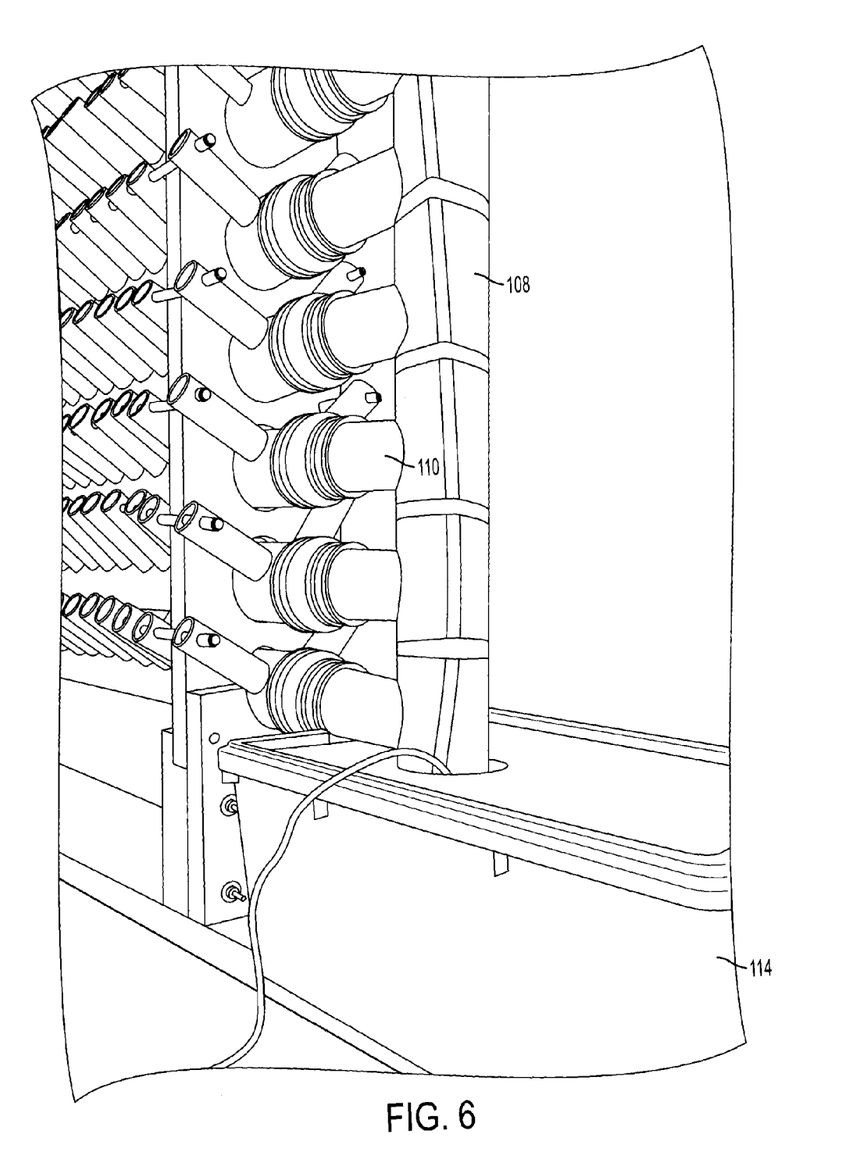
FIG. 6 is a perspective view of the vertical drain and reservoir in accordance with an exemplary embodiment of the present invention.

As the nutrient-enriched water flows through the nutrient-delivering tubes 112, it exits through the openings in the nutrient-delivering tubes 112, flows down the pipe segments 106 to the crops and provides nutrients for their growth. The depleted water then drains through the remaining portion of the pipe segments 106, which are coupled to adjacent horizontal pipes 102, and then drains through the horizontal pipes 102 returning back to the vertical drain pipe 108. As shown in FIG. 5, the nutrient-delivering tubes 112 may be capped at their ends such that there is no escape of the nutrient-enriched water from the hydroponic growing system 100. The horizontal pipes may be slanted to help the depleted water flow back to the vertical drain pipe 108 to be recycled. As seen in FIG. 6, the hydroponic growing system 100 may have a reservoir 114 in which the nutrient-enriched water is stored. The depleted water may also drain back to the reservoir 114. The system may also comprise a water pump coupled to one of the nutrient-delivering tubes to provide adequate water pressure.

As seen in FIGS. 1-2, the hydroponic growing system 100 may have a plurality of parallel vertical support members 101, which have a plurality of openings 107 along their length. The openings 107 receive the first and second ends 103 and 105 of the horizontal pipes 102, and the second end 105 of the horizontal pipes 102 extend through the openings 107 of one of the vertical support members 101.

As seen in FIG. 4, the nutrient-delivering tubes 112 may extend vertically up one of the parallel vertical support members 101 before branching through the pipe segments 106. As best shown in FIGS. 1A-B, the system 100 may also have a horizontal support member 109 coupled to the bottom end of each of the plurality of vertical support members 101.

As illustrated in FIG. 1B, the vertical and horizontal support members, 101 and 109' respectively, may be slanted to aid in the recycling of the depleted water.

The method of growing crops in a hydroponic system 100 comprises a first step of placing young crops in the horizontal pipes 102 adjacent to the openings 104 in the horizontal pipes 102. The vertical drain pipe 108 is then filled with nutrient-enriched water, which is pumped through the nutrient-delivering tubes 112. The nutrient-enriched water exits the nutrient-delivering tubes 112 through the openings on the nutrient-delivering tubes 112 and feeds the crops by draining down the pipe segments 106 extending from the horizontal pipes 102. The depleted water then drains back to the vertical drain pipe 108, going through the pipe segments 106 and horizontal pipes 102, through the angular pipe extensions 110, and back into the vertical drain pipe 108 where it is recycled.

While particular embodiments have been chosen to illustrate the invention, it will be understood by those skilled in the art that various changes and modifications can be made therein without departing from the scope of the invention as defined in the appended claims.

What is claimed is:

1. A hydroponic growing system comprising:
   a plurality of parallel horizontal pipes each having opposite first and second ends and a plurality of openings along a length between said first and second ends through which crops grow;
   a plurality of pipe segments extending from an outer surface of the plurality of parallel horizontal pipes on a side opposite the plurality of openings;
   a vertical drain pipe having a plurality of pipe extensions along a length thereof, said pipe extensions mating with one of said first and second ends of said plurality of parallel horizontal pipes; and
   a plurality of nutrient-delivering tubes having openings along a length thereof, said nutrient delivering tubes extending from a source of nutrient-enriched water and branching through said plurality of pipe segments in a parallel arrangement so as to supply the nutrient-enriched water to each of said plurality of pipe segments individually,
   wherein each of said horizontal pipes is adapted to support crops that receive said nutrient-enriched water from said nutrient-delivering tubes, thereby producing crops in high density.

2. A hydroponic growing system according to claim 1, further comprising:
   a plurality of parallel vertical support members having a plurality of circular openings along a length; and
   at least one horizontal support member coupled to a bottom end of each of said plurality of vertical support members,
   wherein each of said opposing ends of said plurality of parallel horizontal pipes rests within said circular openings of said parallel vertical support members, and at least one end of each of said plurality of parallel horizontal pipes extends through said circular openings.

3. A hydroponic growing system according to claim 2, wherein said plurality of nutrient-delivering tubes extend vertically up one of said plurality of parallel vertical support members.

4. A hydroponic growing system according to claim 2, wherein said plurality of parallel horizontal pipes, said plurality of parallel vertical support members, and said at least one horizontal support member are slanted to allow for reuse of said nutrient-enriched water.

5. A hydroponic growing system according to claim 1, wherein each of said plurality of parallel horizontal pipes are substantially cylindrical.

6. A hydroponic growing system according to claim 1, further comprising a reservoir for storing said nutrient-enriched water.

7. A hydroponic growing system according to claim 1, further comprising a water pump coupled to said source of nutrient-enriched water.

8. A hydroponic growing system according to claim 1, wherein said plurality of pipe segments have opposing circular openings at one end to receive said nutrient-delivering tubes.

9. A hydroponic growing system according to claim 1, wherein a portion of said plurality of pipe segments are coupled to adjacent said horizontal pipes.

10. A hydroponic growing system according to claim 1, wherein said pipe extensions on said vertical drain pipe extend perpendicularly from an outer surface of the vertical drain pipe.

11. A method of growing crops using a hydroponic growing system, comprising the steps of:
providing,
a plurality of parallel horizontal pipes each having opposite first and second ends and a plurality of openings along a length between said first and second ends on one side thereof,
a plurality of pipe segments extending from an outer surface on an opposing side thereof,
a vertical drain pipe having a plurality of pipe extensions along a length thereof, said pipe extensions mating with one of said first and second ends of said plurality of parallel horizontal pipes, and
a plurality of nutrient-delivering tubes having openings along a length thereof, said nutrient-delivering tubes extending from a source of nutrient-enriched water and branching through said plurality of pipe segments in a parallel arrangement so as to supply said nutrient-enriched water to each of said plurality of pipe segments individually,
wherein each of said horizontal pipes is adapted to support crops that receive said nutrient-enriched water from said nutrient-delivering tubes, thereby producing crops in high density;
placing said crops in said plurality of parallel horizontal pipes adjacent to said openings;
pumping said nutrient-enriched water from said source of nutrient-enriched water through said nutrient-delivering tubes,
whereby said nutrient-enriched water exits said openings in said nutrient-delivering tubes, feeds crops, and drains back to said vertical drain pipe through said horizontal pipes and said pipe segments for recycling.

12. A hydroponic growing system comprising:
a plurality of parallel horizontal pipes each having opposite first and second ends and a plurality of openings along a length between said first and second ends through which crops grow;
a plurality of pipe segments extending from an outer surface of the plurality of parallel horizontal pipes opposite the plurality of openings, such that each crop positioned in each of said horizontal pipes is in fluid communication with its own individual pipe segment;
a vertical drain pipe having a plurality of pipe extensions along a length thereof, said pipe extensions mating with one of said first and second ends of said plurality of parallel horizontal pipes; and
a plurality of nutrient-delivering tubes having openings along a length thereof, said nutrient delivering tubes extending from a source of nutrient-enriched fluid and branching through each of said plurality of pipe segments so as to supply the nutrient-enriched fluid to each of said crops individually, thereby producing crops in high density.

13. The hydroponic growing system of claim 12, wherein each of the plurality of pipe segments is aligned with each individual crop positioned in each of said horizontal pipes.

14. The hydroponic growing system of claim 12, wherein each of said plurality of parallel horizontal pipes are substantially cylindrical.

15. The hydroponic growing system of claim 12, further comprising a water pump coupled to said source of nutrient-enriched water.

16. The hydroponic growing system of claim 12, wherein each of said openings in said plurality of nutrient-delivering tubes is aligned with each of said plurality of pipe segments.

17. The hydroponic growing system of claim 12, further comprising a plurality of parallel vertical support members configured to support each of said plurality of parallel horizontal pipes.

18. The hydroponic growing system of claim 17, wherein said plurality of parallel horizontal pipes, said plurality of parallel vertical support members are slanted to allow for drainage and reuse of said nutrient-enriched water.

19. The hydroponic growing system of claim 12, wherein said vertical drain pipe is in fluid communication with a reservoir, whereby depleted water drained through said vertical drain pipe may be recycled to form said source of nutrient-enriched water.

20. The hydroponic growing system of claim 12, wherein said plurality of pipe segments have opposing circular openings at one end to receive said nutrient-delivering tubes.

* * * * *